(12) United States Patent
Gill et al.

(10) Patent No.: US 7,612,970 B2
(45) Date of Patent: Nov. 3, 2009

(54) MAGNETORESISTIVE SENSOR WITH A FREE LAYER STABILIZED BY DIRECT COUPLING TO IN STACK ANTIFERROMAGNETIC LAYER

(75) Inventors: Hardayal Singh Gill, Palo Alto, CA (US); Kuok San Ho, Santa Clara, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 554 days.

(21) Appl. No.: 11/065,244

(22) Filed: Feb. 23, 2005

(65) Prior Publication Data
US 2006/0187591 A1 Aug. 24, 2006

(51) Int. Cl.
G11B 5/39 (2006.01)
(52) U.S. Cl. .................................. 360/324.12
(58) Field of Classification Search ........................ None
See application file for complete search history.

(56) References Cited

U.S. PATENT DOCUMENTS

| | | | | | |
|---|---|---|---|---|---|
| 5,408,377 | A | * | 4/1995 | Gurney et al. ................ | 360/325 |
| 5,701,223 | A | * | 12/1997 | Fontana et al. ........... | 360/324.11 |
| 6,023,395 | A | | 2/2000 | Dill et al. ..................... | 360/113 |
| 6,057,049 | A | | 5/2000 | Fuke et al. ................... | 428/700 |
| 6,556,392 | B1 | * | 4/2003 | Mao et al. ............... | 360/324.12 |
| 6,563,682 | B1 | | 5/2003 | Sugawara et al. ......... | 360/324.2 |
| 6,657,825 | B2 | | 12/2003 | Ho et al. ...................... | 360/321 |
| 6,671,139 | B2 | | 12/2003 | Carey et al. ............ | 360/324.12 |
| 6,700,760 | B1 | * | 3/2004 | Mao ........................ | 360/324.2 |
| 6,704,175 | B2 | * | 3/2004 | Li et al. ................... | 360/324.11 |
| 6,806,804 | B2 | | 10/2004 | Saito et al. .................. | 336/200 |
| 6,822,838 | B2 | | 11/2004 | Lin et al. ................... | 360/324.2 |
| 6,853,520 | B2 | * | 2/2005 | Fukuzawa et al. ........ | 360/324.1 |
| 2002/0154456 | A1 | | 10/2002 | Carey et al. ............ | 360/324.11 |
| 2004/0160707 | A1 | | 8/2004 | Saito et al. ............. | 360/324.11 |
| 2006/0044707 | A1 | * | 3/2006 | Araki et al. ............ | 360/324.12 |

FOREIGN PATENT DOCUMENTS

JP 9069211 3/1997

OTHER PUBLICATIONS

Michael K. Ho, Ching Tsang, Jeff Childress, Robert Fontana, Jordan Katine, and Kashmira Carey, "Study of Longitudinal Stabilization Using In-Stack Biasing," IEEE Transactions on Magnetics, vol. 40, No. 1, Jan. 2004.

Sining Mao, Zheng Gao, Haiwen Xi, Paul Kolbo, Martin Plumer, Lei Wang Anuja Goyal, Insik Jin, Jian Chen, *Member, IEEE*, Chunhong Hou, R.M. White, *Fellow, IEEE*, and Ed Murdock, *Member, IEEE*, "Spin-Valve Heads With Self-Stabilized Free Layer by Antiferromagnet," IEEE Transactions on Magnetics, vol. 38, No. 1, Jan. 2002.

(Continued)

*Primary Examiner*—Mark Blouin
(74) *Attorney, Agent, or Firm*—Zilka-Kotab, PC

(57) ABSTRACT

A magnetoresistive sensor having a free layer biased by an in stack bias layer that comprises a layer of antiferromagnetic material. The bias layer can be IrMnCr, IrMn or some other antiferromagnetic material. The free layer is a synthetic free layer having first and second magnetic layers antiparallel coupled across an AP coupling layer. The first magnetic layer is disposed adjacent to a spacer or barrier layer and the second magnetic layer is exchange coupled with the IrMnCr bias layer. The bias layer biases the magnetic moments of the free layer in desired directions parallel with the ABS without pinning the magnetic moments of the free layer.

25 Claims, 3 Drawing Sheets

OTHER PUBLICATIONS

Jeffrey R. Childress, Michael K. Ho, Robert E. Fontana, Matthew J. Carey, Philip M. Rice, Bruce A. Gurney, and Ching H. Tsang, "Spin-Valve and Tunnel-Valve Structures with In Situ In-Stack Bias," IEEE Transactions on Magnetics, vol. 38, No. 5, Sep. 2002.

Youfeng Zheng, Kochan Ju, Jeiwei Chang and Ben Hu, "Stability in In-Stack Biased CPP SV Heads," IEEE Transactions on Magnetics, vol. 40, No, 4, Jul. 2004.

Susumu Soeya, Hiroyuki Hoshiya, Reiko Arai, and Moriaki Fuyama, "Effect of Metallic Additives (M) on the Exchange Coupling of Antiferromagnetic $CrMnM_x$ Films to a Ferromagnetic $Ni_{81}Fe_{19}$ Film," J. Appl. Phys. 81 (9), May 1, 1997.

M.J. Carey, A. Kellock, L. Baril, J.R. Childress, T. Le, T. Thompson, and B.A. Gurney, "Improved Corrosion Resistance of IrMn by Cr and Ru Additions," Applied Physics Letters, vol. 81, No. 27, Dec. 30, 2002.

* cited by examiner

MAGNETORESISTIVE SENSOR WITH A FREE LAYER STABILIZED BY DIRECT COUPLING TO IN STACK ANTIFERROMAGNETIC LAYER

FIELD OF THE INVENTION

The present invention relates to current perpendicular to plane (CPP) magnetoresistive sensors having a novel in stack free layer bias structure that provides improved free layer stability and decreased sensor thickness.

BACKGROUND OF THE INVENTION

The heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic impressions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos $\Theta$, where $\Theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

When a spin valve sensor employs a single pinned layer it is referred to as a simple spin valve. When a spin valve employs an antiparallel (AP) pinned layer it is referred to as an AP pinned spin valve. An AP spin valve includes first and second magnetic layers separated by a thin non-magnetic coupling layer such as Ru. The thickness of the spacer layer is chosen so as to antiparallel couple the magnetizations of the ferromagnetic layers of the pinned layer. A spin valve is also known as a top or bottom spin valve depending upon whether the pinning layer is at the top (formed after the free layer) or at the bottom (before the free layer).

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

Magnetization of the pinned layer is usually fixed by exchange coupling one of the ferromagnetic layers (AP1) with a layer of antiferromagnetic material such as PtMn. While an antiferromagnetic (AFM) material such as PtMn does not in and of itself have a magnetization, when exchange coupled with a magnetic material, it can strongly pin the magnetization of the ferromagnetic layer.

In order to meet the ever increasing demand for improved data rate and data capacity, researchers have recently been focusing their efforts on the development of perpendicular recording systems. A traditional longitudinal recording system stores data as magnetic bits oriented longitudinally along a track in the plane of the surface of the magnetic disk. This longitudinal data bit is recorded by a fringing field that forms between a pair of magnetic poles separated by a write gap. A perpendicular recording system, on the other hand, records data as magnetic transitions oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole.

The advent of perpendicular recording systems has lead to an increased interest in current perpendicular to plane (CPP) sensors, which are particularly suited to use in perpendicular recording systems, due to their ability to read signals from a high coercivity medium. This is in part due to the short gap height afforded by such CPP sensors which allows them to read a very short bit of data. A CPP sensor differs from a more conventional current in plane (CIP) sensor such as that discussed above in that the sense current flows through the CPP sensor from top to bottom in a direction perpendicular to the plane of the layers making up the sensor. Whereas the more traditional CIP sensor has insulation layers separating it from the shields, the CPP sensor contacts the shields at its top and bottom surfaces, thereby using the shields as leads.

A challenge to constructing a practical CPP GMR sensor is the necessity of having an insulation layer at either side of the sensor. In a CPP sensor, sense is conducted from the top of the sensor to the bottom of the sensor perpendicular to the plane of the layers by leads that also may act as magnetic shields. In order to prevent current from being shunted from one lead to the other across the hard bias layers that typically extend from the sides of the sensor an insulation layer must be provided to cover the sides of the sensor and at least one of the leads. This insulation layer weakens the magnetostatic coupling between the bias layer and the free layer. Therefore, traditional hard bias layers, formed at either side of the sensor, are less effective in a CPP sensor.

One way to overcome the drawbacks of such hard bias layers in a CPP sensor design is to construct an in stack bias structure. In stack bias structures that have been proposed include a layer of magnetic material such as NiFe separated from the free layer by a spacer layer such as Ta. The magnetic layer, or biasing layer, is then exchange coupled with a layer of antiferromagnetic material (AFM layer) such as PtMn. Unfortunately however, in order to provide significant biasing, the magnetic layer (bias layer) must be very thick. For example, the bias layer must be 1.5 to 2 times the thickness of the free layer. The AFM layer itself must also be very thick, even thicker than the bias layer.

Unfortunately, such a thick magnetic layer exhibits poor exchange coupling with the AFM layer. Therefore, the bias structure described above, does not provide strong stable biasing. Also, as can be seen from the above description, such a bias structure must be very thick. This thick bias structure degrades sensor performance in a CPP sensor by increasing parasitic resistance. In a CIP sensor such a structure would also lead to current shunting. The thick in stack bias structure also uses a lot of gap thickness resulting in increased bit length and, therefore, to decrease data density.

Another problem confronted by current sensor designs is that as the track width of the sensor decreases, the magnetic properties of the ever smaller free layer become more unstable. Therefore, prior art biasing structures (whether hard magnetic or in stack) provide insufficient free layer biasing to stabilize the increasingly unstable free layer in such smaller sensors.

Therefore, there is a strong felt need for a practical in stack bias structure that can provide sufficiently strong and uniform free layer biasing while also maintaining a desirable low sensor stack thickness. Such a design would preferably provide sufficiently strong free layer biasing to prevent free layer instability at very a small track widths.

SUMMARY OF THE INVENTION

The present invention provides a magnetoresistive sensor having a synthetic free layer biased by an in stack bias layer comprising an antiferromagnetic layer such as IrMnCr, IrMn or some other antiferromagnetic material. The synthetic free layer includes first and second free magnetic layers that are antiparallel coupled across an AP coupling layer. one of the first and second free magnetic layers is exchange coupled with the antiferromagnet biasing layer.

The antiferromagnet bias layer, when exchange coupled one of the magnetic layers of the free layer biases the moment of that layer without pinning that magnetic layer. Exchange coupling of the bias layer with the second magnetic layer of the free layer results in increased resistance and decreased specular scattering at the interface of the bias layer and the second magnetic layer.

This increased resistance and decreased specular scattering at the interface of the bias layer and second free magnetic layer advantageously reduces the negative GMR contribution that would otherwise result from presence of the second magnetic free layer. This advantageously allows the benefits of a synthetic free layer to be achieved without the usual negative effects of the subtractive GMR from the second layer. The present invention also provides excellent uniform free layer biasing across the width of the free layer.

The strength of the biasing provided by the IrMnCr bias layer can be adjusted to a desired amount by adjusting either or both of the Cr content and thickness of the bias layer.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
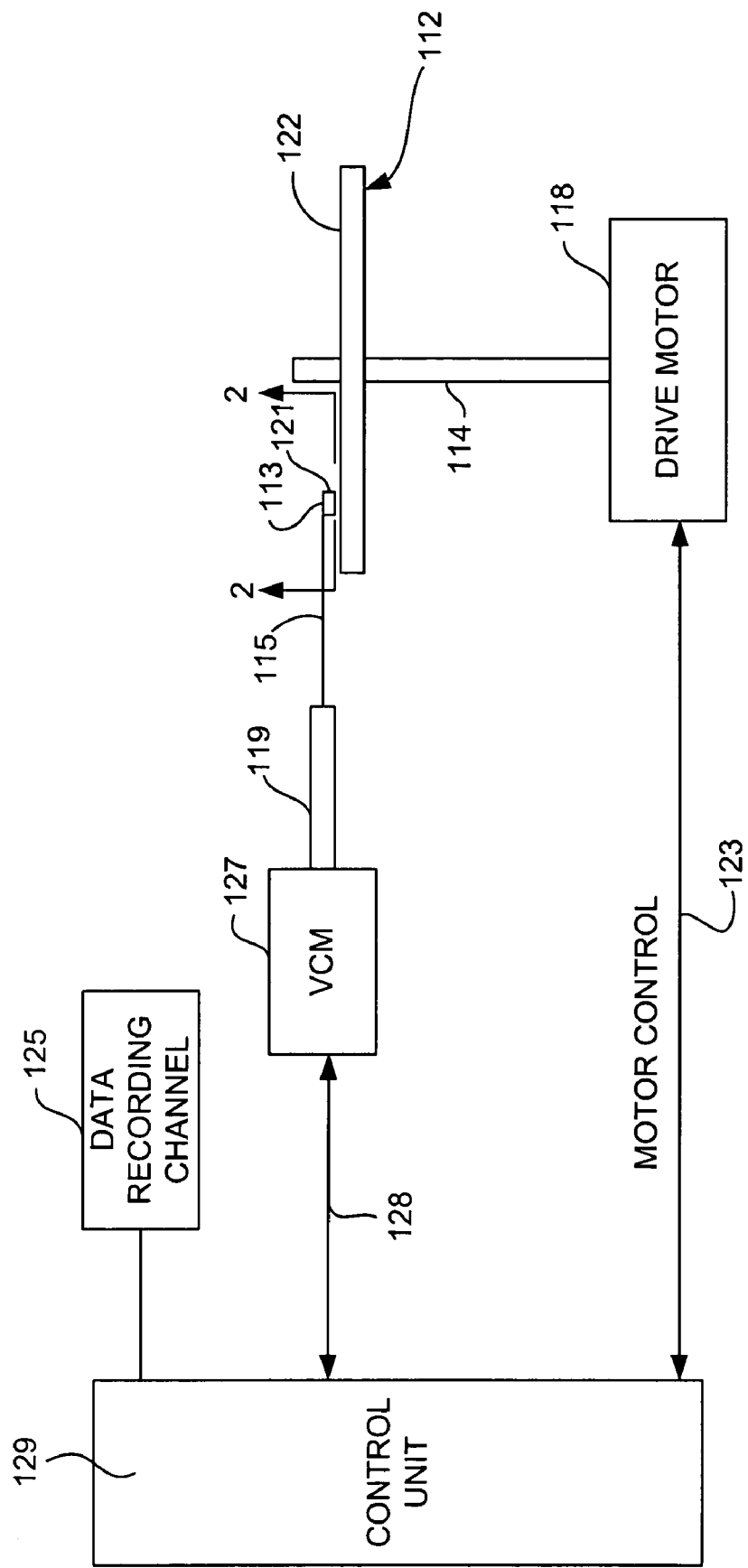
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
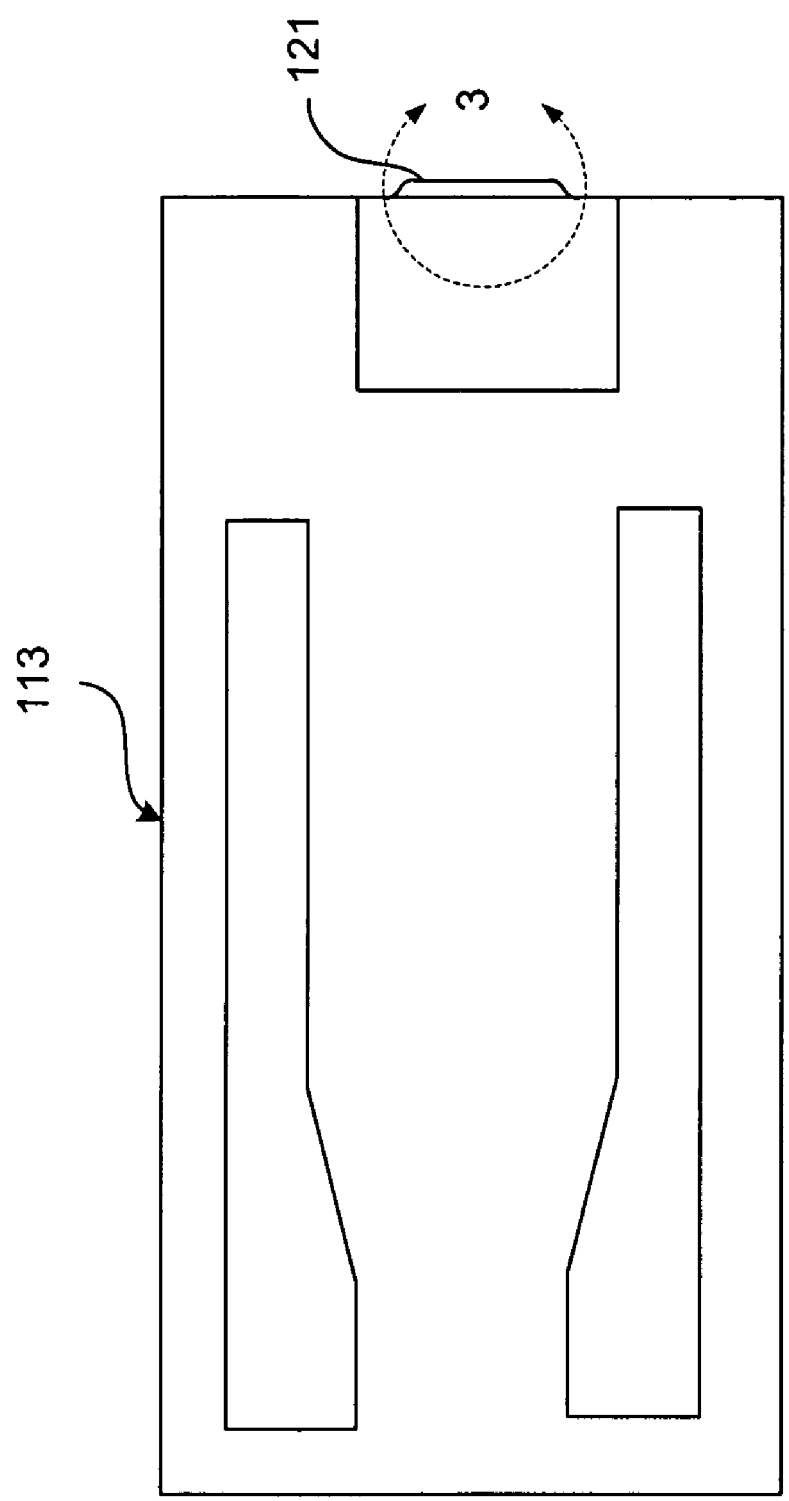
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
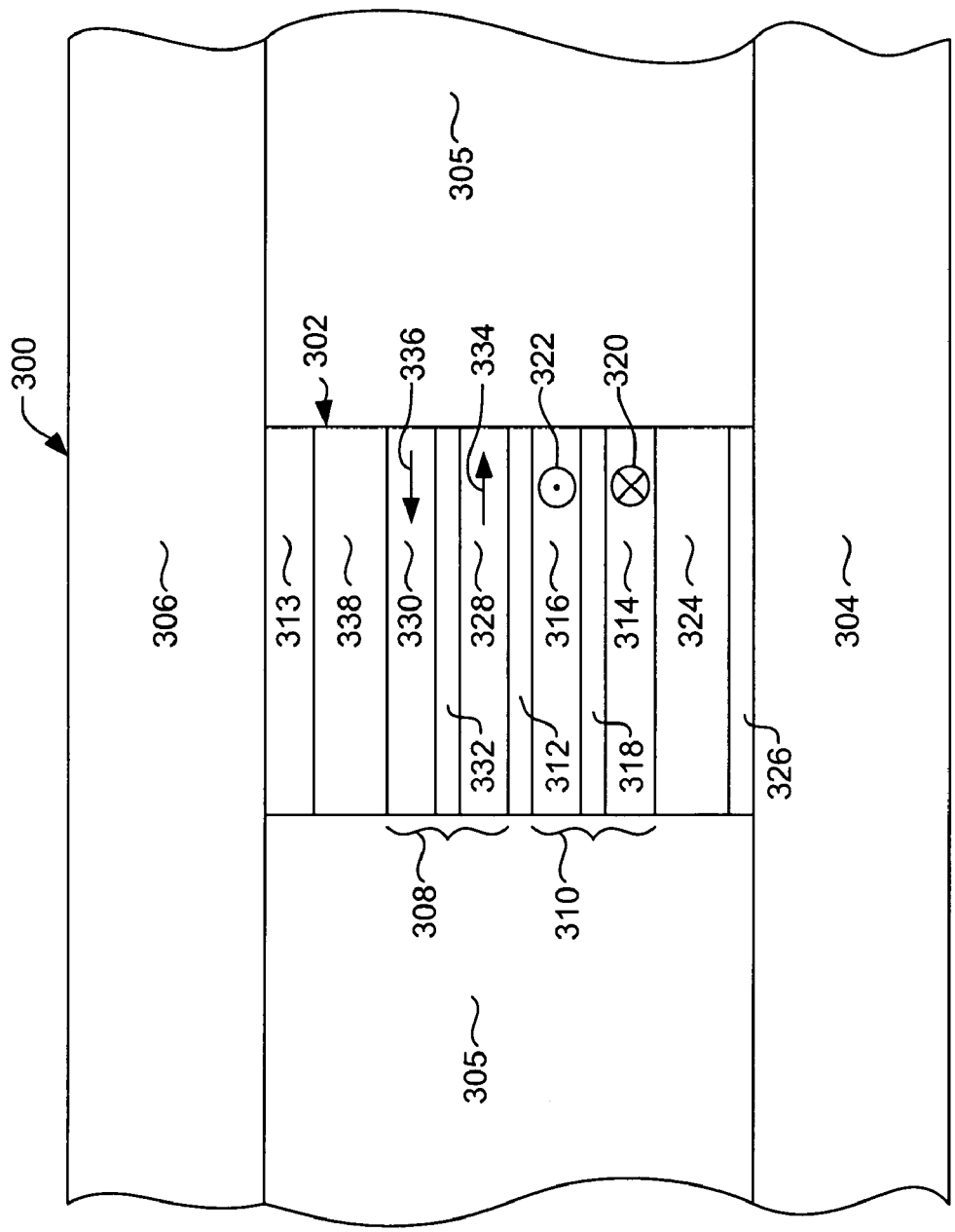
FIG. 3 is an ABS view of a magnetic sensor according to an embodiment of the present invention taken from circle 3 of FIG. 2.

With reference now to FIG. 3, a magnetoresistive sensor 300 according to an embodiment of the invention includes a magnetoresistive sensor element or sensor stack 302, sandwiched between first and second leads 304, 306. The first and second leads 304, 306 can be constructed of an electrically conductive, magnetic material such as NiFe and can thereby serve as magnetic shields as well as leads. Non-magnetic, electrically insulating gap material 305 fills the space between the shields 304, 306 outside of the sensor stack 302.

The sensor stack 302 includes a magnetic free layer structure 308 and a magnetic pinned layer structure 310. A non-magnetic, electrically conductive spacer layer 312 such as Cu is sandwiched between the free and pinned layers. It should be pointed out that the present invention is being described as a current perpendicular to plane GMR sensor, however, the present invention could also be embodied in a tunnel valve sensor, in which case a non-magnetic, electrically insulating barrier layer such as alumina would be sandwiched between the free and pinned layers 308, 310 rather than the electrically conductive spacer layer 312. If the sensor 300 is a tunnel valve sensor, then the free layer 308 can be a simple, single layer free layer structure rather than an AP coupled synthetic free layer. This is because the decrease in specular scattering from the exchange coupling between the free layer 308 and the bias layer 338 does not have the same deleterious effect on tunnel valve performance as it does in a GMR sensor. Therefore, in a tunnel valve design, the free layer 308 can be either a simple free layer or an AP coupled synthetic free layer. A capping layer 313, such as Ta may be provided at the top of the sensor stack 302 to protect the layers of the sensor stack 302 from damage during manufacture.

The pinned layer 310 may be an antiparallel coupled (AP coupled) pinned layer having a first magnetic layer AP1 314, and a second magnetic layer AP2 316, both of which are antiparallel coupled across an AP coupling layer 318 such as Ru. The AP1 and AP2 layers 314, 316 may be constructed of CoFe. The magnetic moment 320, 322 of each of the AP1 and AP2 layers 314, 316 can be pinned by a layer of antiferromagnetic material (AFM layer) 324 that is exchange coupled with the AP1 layer 314. The AFM layer 324 may be constructed of several materials such as PtMn or IrMn and is preferably PtMn. A seed layer 326 may be provided at the bottom of the sensor stack 302 to initiate a desired grain growth in the sensor stack 302.

With continued reference to FIG. 3, the free layer 308 is preferably an antiparallel coupled (AP coupled) synthetic free layer having first and second free magnetic layers 328, 330 that are antiparallel coupled across an AP coupling layer such as Ru 332. The first and second magnetic layers 328, 330 of the free layer 308 have magnetic moments 334, 336 that are oriented antiparallel to one another but are free to rotate in response to a magnetic field while remaining antiparallel to one another. The first and second free magnetic layers 328, 330 can be constructed of for example CoFe or may be a combination of a CoFe and NiFe. Preferably the first magnetic layer 328 includes a layer of Co or CoFe adjacent to the spacer/barrier 312 and the second magnetic layer 330 preferably includes NiFe either as the entire second layer 330 or as a layer of CoFe and a layer of NiFe with the NiFe being disposed adjacent to the bias layer 338.

The magnetic moments 334, 336 are biased in directions parallel with the ABS by a novel in stack bias layer 338 that is in direct contact with and exchange coupled with the second or outermost magnetic layer 330. The bias layer 338 comprises an antiferromagnetic material such as IrMnCr, IrMn or some other suitable antiferromagnetic material, and when exchange coupled with the second magnetic layer 330 of the free layer 308, it can bias the moment 336 of the magnetic layer 330 in a manner similar to that by which the AFM pinning layer 324 pins moment 320 of the magnetic layer 314, but without actually pinning the moment 336 of the free magnetic layer 330. This is because, the antiferromagnetic biasing layer 338, when exchange coupled with the free magnetic layer 330 creates an exchange field that is substantially weaker than that generated between the AFM pinning layer 324 and the pinned layer 314. This weaker exchange field is in part because the net magnetic thickness of the pinned layer 310 (magnetic thickness of AP1 314 minus the magnetic thickness of AP2 316) is much less than the net magnetic thickness of free layer 308 (magnetic thickness of the first free magnetic layer 328 minus the magnetic thickness of the second free magnetic layer 330). The composition of the free layer 308 also plays a roll in controlling the exchange coupling between the bias layer 338 and the second layer 330 of the free layer 308. Constructing the second free magnetic layer 330 of NiFe results in weaker exchange coupling with the bias layer 338 than would be the case if the free layer 330 were constructed of CoFe, especially CoFe having a high Fe content. The exchange coupling between the bias layer 338 and the second free layer 330 can also be controlled by controlling the thickness of the bias layer 338 (a thinner bias layer resulting in decreased exchange coupling). If IrMnCr is used as the bias layer 324 the strength of this exchange field can be controlled by adjusting either the amount of Cr in the IrMnCr bias layer 338 or the thickness of the bias layer 338 or both. This allows just the right amount of bias field to be applied to the free layer 308 to provide the perfect balance of free layer stability and free layer sensitivity. Furthermore, the bias layer 338 distributes this perfectly tuned bias field evenly and consistently over the entire width of the free magnetic layer 330.

Synthetic free layers previously proposed for use in GMR sensors have suffered from the disadvantage that the second magnetic layer 330 generates a negative or subtractive GMR effect. However, because the first magnetic free layer 328 is closer to the spacer layer 312 than the second layer 330 is and is usually constructed to have a larger magnetic thickness than the second layer 330, the additive GMR effect of the first layer 328 is greater than that of the second layer 330 creating a net GMR effect. The subtractive GMR effect of the second layer 330 is also offset to some extent to by the increased free layer sensitivity and stability provided by such synthetic free layers.

It has also been found that when an antiferromagnetic bias layer (such as a IrMnCr bias layer) is exchange coupled with a magnetic layer such as a free layer a large electrical resistance forms at the junction of the magnetic layer and the bias layer. Specular scattering at the interface of the bias layer and free layer is seriously diminished. Therefore, if the IrMnCr bias layer were exchange coupled with a simple, single layer free layer, this increased resistance and decreased specular scattering would kill the GMR effect.

These two seemingly negative effects (1—increased resistance and decreased scattering when using the antiferromagnetic bias layer, and 2—the subtractive GMR effect of the second layer of a synthetic free layer) can actually be combined to provide a novel GMR sensor having exceptional GMR performance. By exchange coupling the bias layer 338 with the second layer 330 of the free layer 308, the subtractive GMR effect of the second magnetic free layer 330 is greatly reduced or eliminated. This is due to the above described increased resistance and decreased specular scattering at the interface of the bias layer 338 and the second magnetic free layer 330. This allows one to take full advantage of the excellent biasing properties of the antiferromagnetic in stack bias layer 338 while also taking advantage of the sensitivity and stability of the synthetic free layer 308, without suffering the otherwise experienced negative effects of either of these structures.

The moments 334, 336 can be set by an anneal process that involves heating the sensor 300 to a temperature above the blocking temperature of the bias layer 338 and applying a magnetic field. The sensor 300 is then cooled while continuing to apply the magnetic field.

Although described as a CPP GMR sensor having a pinned layer structure at the bottom, the present invention can be practiced in any number of other magnetoresistive sensor designs. For example, the sensor 300 could be a current in plane GMR sensor, in which case the shields would be separated from the sensor stack by a layer of insulation. In addition, the sensor 300 could be a tunnel valve or tunnel junction sensor in which case the free and pinned layers would be separated by an electrically insulating barrier layer. Furthermore, the sensor 300 could be either a top or bottom sensor in that the pinned layer could be located either above or below the free layer. The pinned layer could also be a simple pinned layer, an AP coupled AFM pinned structure (as described), or a self pinned AP coupled pinned layer structure.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetoresistive sensor, comprising:
   a magnetic pinned layer structure;
   a magnetic free layer structure;
   a non-magnetic, electrically conductive spacer layer sandwiched between the free and pinned layer structures; and
   a bias layer comprising an antiferromagnetic material, the antiferromagnetic material being in contact with the free layer structure;
   wherein the free layer structure comprises a first free magnetic layer, a second free magnetic layer and a coupling layer sandwiched between the first and second free magnetic layers, the first free magnetic layer and the second free magnetic layer having magnetizations that are free to move in response to a magnetic field, and wherein the first free magnetic layer is adjacent to the spacer layer and the second free magnetic layer is in contact with the bias layer.

2. A sensor as in claim 1 wherein the second free magnetic layer is exchange coupled with the bias layer.

3. A sensor as in claim 1, wherein the bias layer has a thickness that is chosen to provide a desired amount of free layer biasing.

4. A sensor as in claim 1, wherein the bias layer comprises IrMnCr.

5. A sensor as in claim 4, wherein the bias layer has a thickness and a Cr content chosen to provide, in combination, a desired amount of free layer biasing.

6. A sensor as in claim 1 further comprising first and second electrically conductive magnetic shields in electrical communication with the free and pinned layers.

7. A sensor as in claim 1 wherein the free layer structure, pinned layer structure, and spacer layer are located between and electrically insulated from first and second magnetic shields.

8. A sensor as in claim 1 wherein the pinned layer structure is formed above the free layer structure.

9. A sensor as in claim 1 wherein the pinned layer structure is formed below the free layer structure.

10. A sensor as in claim 1 wherein the pinned layer is an AP coupled pinned layer.

11. A sensor as in claim 1 wherein the pinned layer structure is a simple pinned layer structure.

12. A magnetoresistive sensor, comprising:
    a magnetic pinned layer structure;
    a magnetic free layer structure having a magnetization that is free to move in response to a magnetic field;
    a non-magnetic, electrically insulating barrier layer sandwiched between the free and pinned layer structures; and
    a bias layer comprising an antiferromagnetic material, the anriferromagnetic material being in contact with the free layer structure;
    wherein the bias layer comprises IrMnCr.

13. A sensor as in claim 12 wherein the free layer structure comprises a first free magnetic layer, a second free magnetic layer and a coupling layer sandwiched between the first and second free magnetic layers, and wherein the first free magnetic layer is adjacent to the barrier layer and the second free magnetic layer is in contact with the bias layer.

14. A sensor as in claim 12 wherein the second free magnetic layer is exchange coupled with the bias layer.

15. A sensor as in claim 12, wherein the bias layer has a thickness that is chosen to provide a desired amount of free layer biasing.

16. A sensor as in claim 12, wherein the bias layer has a thickness and a Cr content chosen to provide, in combination, a desired amount of free layer biasing.

17. A sensor as in claim 12 further comprising first and second electrically conductive magnetic shields in electrical communication with the free and pinned layers.

18. A sensor as in claim 12 wherein the free layer structure, pinned layer structure, and spacer layer are located between and electrically insulated from first and second magnetic shields.

19. A sensor as in claim 12 wherein the pinned layer structure is formed above the free layer structure.

20. A sensor as in claim 12 wherein the pinned layer structure is formed below the free layer structure.

21. A magnetoresistive sensor, comprising:

a free layer structure including a first free magnetic layer, a second free magnetic layer and a non-magnetic, electrically conducive spacer layer disposed between the first and second free magnetic layers the first free magnetic layer and the second free magnetic layer each having a magnetization that is free to move in response to a magnetic field; and a bias layer comprising an antiferromagnetic material, the antiferromagnetic material being exchange coupled with the second free magnetic layer.

22. A magnetoresistive sensor as in claim 21, wherein the second free magnetic layer comprises NiFe.

23. A magnetoresistive sensor as in claim 21, wherein the first free layer comprises Co and second free magnetic layers each comprises NiFe.

24. A magnetoresistive sensor as in claim 21, wherein the bias layer comprises IrMnCr.

25. A magnetic data recording system, comprising:

a magnetic medium;

a slider;

an actuator connected with the slider for moving the slider adjacent to a surface of the magnetic medium; and a magnetoresisitve sensor connected with the slider, the magnetoresistive sensor comprising:

a free layer structure including a first free magnetic layer, a second free magnetic layer and a non-magnetic, electrically conducive spacer layer disposed between the first and second free magnetic layers the first free magnetic layer and second free magnetic layer each having a magnetization that is free to move in response to a magnetic field; and a bias layer comprising an antiferromagnetic material, the antiferromagnetic material being exchange coupled with the second free magnetic layer.

\* \* \* \* \*

UNITED STATES PATENT AND TRADEMARK OFFICE
CERTIFICATE OF CORRECTION

PATENT NO. : 7,612,970 B2 Page 1 of 1
APPLICATION NO. : 11/065244
DATED : November 3, 2009
INVENTOR(S) : Hardayal Singh Gill et al.

It is certified that error appears in the above-identified patent and that said Letters Patent is hereby corrected as shown below:

In claim 12, column 8, line 47, please replace "anriferromagnetic" with --antiferromagnetic--.

Signed and Sealed this

Eighth Day of June, 2010

David J. Kappos
*Director of the United States Patent and Trademark Office*